US009977790B2

(12) United States Patent
Abraham et al.

(10) Patent No.: US 9,977,790 B2
(45) Date of Patent: May 22, 2018

(54) AUTOMATICALLY OBTAINING REAL-TIME, GEOGRAPHICALLY-RELEVANT PRODUCT INFORMATION FROM HETEROGENEUS SOURCES (75) Inventors: Jack Phillip Abraham, Palo Alto, CA (US); Aaron Adelson, Palo Alto, CA (US); Matthew Barto, San Francisco, CA (US); Theodore James Dziuba, San Mateo, CA (US); John Evans, Palo Alto, CA (US); Neville Newey, Pleasanton, CA (US); Justin Van Winkle, San Jose, CA (US)

(73) Assignee: eBay, Inc., San Jose, CA (US)

( * ) Notice: Subject to any disclaimer, the term of this patent is extended or adjusted under 35 U.S.C. 154(b) by 1012 days.

(21) Appl. No.: 13/366,962

(22) Filed: Feb. 6, 2012

(65) Prior Publication Data
US 2012/0203760 A1  Aug. 9, 2012

Related U.S. Application Data (60) Provisional application No. 61/439,724, filed on Feb. 4, 2011.

(51) Int. Cl.
*G06F 17/30* (2006.01)
(52) U.S. Cl.
CPC .. *G06F 17/30241* (2013.01); *G06F 17/30864* (2013.01)
(58) Field of Classification Search
CPC ................ G06F 17/30241; G06F 17/30864
USPC ......................................................... 707/710
See application file for complete search history.

(56) References Cited

U.S. PATENT DOCUMENTS

| 2002/0111880 A1* | 8/2002 | Stutts | G06Q 30/02 705/26.81 |
|---|---|---|---|
| 2003/0028451 A1* | 2/2003 | Ananian | 705/27 |
| 2005/0075926 A1* | 4/2005 | Liu et al. | 705/14 |
| 2005/0116033 A1* | 6/2005 | Moore | 235/385 |
| 2006/0059424 A1* | 3/2006 | Petri et al. | 715/530 |
| 2007/0124721 A1* | 5/2007 | Cowing et al. | 717/100 |

(Continued)

OTHER PUBLICATIONS

Allan Heydon et al, "Mercator: A Scalable, Extensible Web Crawler", 1999, https://webarchive.jira.com/wiki/download/.../ 5441/1999-Mercator.pdf, pp. 1-15.*

*Primary Examiner* — Jared M Bibbee
(74) *Attorney, Agent, or Firm* — Schwegman Lundberg & Woessner, P.A.

(57) ABSTRACT

Techniques for obtaining geographically-relevant product inventory information, in real-time, from heterogeneous data sources are described. Product inventory information, including the volume of available products in specific geographical locations, is obtained from at least three different sources. First, one or more data feeds may be received. Second, a data obtaining module uses one or more APIs to obtain product inventory information from one or more third-party inventory management systems. Finally, a structured data mining module uses a web crawler, at the direction of a crawler configuration, to systematically obtain product inventory information from various third-party websites. Accordingly, a user's search query is processed to provide geographically relevant product inventory information in near real time.

15 Claims, 4 Drawing Sheets (56) References Cited

U.S. PATENT DOCUMENTS

| | | |
|---|---|---|
| 2008/0195507 A1* | 8/2008 | Ratnakar .......................... 705/27 |
| 2008/0313165 A1* | 12/2008 | Wu et al. ........................... 707/5 |
| 2010/0086192 A1* | 4/2010 | Grigsby et al. ............... 382/141 |
| 2010/0114957 A1* | 5/2010 | Benson et al. ................ 707/780 |
| 2010/0125497 A1* | 5/2010 | Arguello .................... 705/14.33 |
| 2012/0072409 A1* | 3/2012 | Perry et al. ................... 707/710 |
| 2012/0191719 A1* | 7/2012 | Musgrove et al. ........... 707/740 |
| 2012/0246022 A1* | 9/2012 | Johnson et al. ............. 705/26.5 |

* cited by examiner

AUTOMATICALLY OBTAINING REAL-TIME, GEOGRAPHICALLY-RELEVANT PRODUCT INFORMATION FROM HETEROGENEUS SOURCES

RELATED APPLICATIONS

The present application claims the benefit of priority, under 35 U.S.C. § 119(e), to U.S. Provisional Patent Application Ser. No. 61/439,724, entitled, "Methods and Systems for Automatically Obtaining Real-Time, Geographically-Relevant Product Information From Heterogeneous Sources, and Enhancing and Presenting the Product Information", filed on Feb. 4, 2011, which is by way of reference incorporated herein in its entirety.

TECHNICAL FIELD

The present disclosure generally relates to data processing techniques for obtaining from disparate and heterogeneous sources, real-time, geographically-relevant information concerning products and their availability.

BACKGROUND

The Internet and the World Wide Web have given rise to a wide variety of on-line retailers that operate virtual stores from which consumers can purchase products (i.e., merchandise, or goods) as well as services. Although the popularity of these on-line retail sites is clearly evidenced by their increasing sales, for a variety of reasons, some consumers may still prefer to purchase products and services in a more conventional manner—i.e., via a brick-and-mortar store.

DESCRIPTION OF THE DRAWINGS

Some embodiments are illustrated by way of example and not limitation in the figures of the accompanying drawings.

DETAILED DESCRIPTION

The present disclosure describes data processing techniques for obtaining from disparate and heterogeneous sources, real-time, geographically-relevant information concerning products and their availability. In the following description, for purposes of explanation, numerous specific details are set forth in order to provide a thorough understanding of the various aspects of different embodiments of the present invention. It will be evident, however, to one skilled in the art, that the present invention may be practiced without all of the specific details.

Embodiments of the present invention involve a set of sophisticated and computer-implemented automated tools and processes for obtaining current data about products and their availability from a wide variety of data sources, such as web sites, network-connected databases, inventory systems, and so forth. In particular, the systems and methods described herein facilitate obtaining and presenting in near real-time, geographically-relevant data concerning products and their availability, such that a potential consumer can perform a web-based search to locate a product, with its current inventory information, at a retail store in a particular geographical area. For example, an automated process (e.g., a crawler) can be configured to obtain product information from a variety of web sites. Alternatively, an external database may be accessed via an application programming interface (API). In any case, once the data is obtained, this data is enhanced and stored in a local database. The data can then be presented to potential consumers in response to a consumer browsing or searching for relevant products and specifying a particular location. As there are many stages involved in the overall process of obtaining, enhancing and presenting this product data, the following description of the inventive subject matter is presented in sections, which loosely correlate with the various stages.

Data Acquisition—Structured Data Mining

Consistent with some embodiments of the inventive subject matter, data from a wide variety of sources is obtained via a system and method of structured data mining. The system and related automated processes that facilitate the structured data mining consist primarily of two components. The first is a web-based application (referred to herein as the crawler construction kit, or CCK) used to configure one or more proprietary crawlers. A crawler (sometimes referred to as a web crawler, or bot) is an automated computer program process that operates to browse the Internet or World Wide Web in a methodical manner, gathering or obtaining data in an orderly fashion. The CCK is a web-based application that allows its user to browse a retailer's web site and quickly establish a crawler configuration—e.g., a set of automated steps—that is required to obtain some item of information (e.g., the color, price, quantity available, etc.) about a particular product being offered via a particular retailer. Accordingly, using the CCK, a user can create a crawler configuration (e.g., a set of interpretable, or executable, instructions), which is then used to direct a crawler to perform a particular set of operations to obtain a particular set or item of data, and thereby populate a database with product inventory information obtained automatically from various websites. This type of technique is generally referred to as web scraping.

With some embodiments, the CCK provides a user with a web-based set of tools for selecting and tagging various elements of a web page that correspond with elements of product inventory information that can be automatically extracted by an automated crawler. For instance, with some embodiments, the CCK application enables a user to manipulate a cursor with a pointing device to interact with elements on a web page, for example, by clicking, selecting, dragging, etc. When a particular item or element of information displayed on the web pages has been selected, the source document underlying the web page is analyzed to identify information that might be used by a crawler to extract or obtain the element of information. This information is then automatically populated in a crawler configuration (e.g., a configuration file) for a particular crawler that will later be used to periodically obtain the set or item of information. In some cases, the CCK application may prompt the user to select various options or settings for use in obtaining a particular element of information. Additionally, as discussed briefly below, the user may opt to open a separate window, pane or similar user interface element in which the user can directly edit a snippet of code for inclusion with the crawler configuration for the specified crawler. For instance, in certain scenarios, a user may be required to customize a crawler configuration to direct a crawler to perform some specialized operation(s) that are required to obtain a particular element of information.

Once extracted, the data may be manipulated or enhanced and then inserted into a database and used in the processing of users' queries, and presentation in search results, etc. With some embodiments, normalizing the information so that common characteristics can be compared with a common nomenclature may enhance the information. Additionally, with some embodiments, specific products may be categorized and classified into a proprietary hierarchy. Similarly, with some embodiments, products may be assigned to proprietary product identifiers, where common, publicly available SKU's (or other identifiers) are not used.

Figure 1:
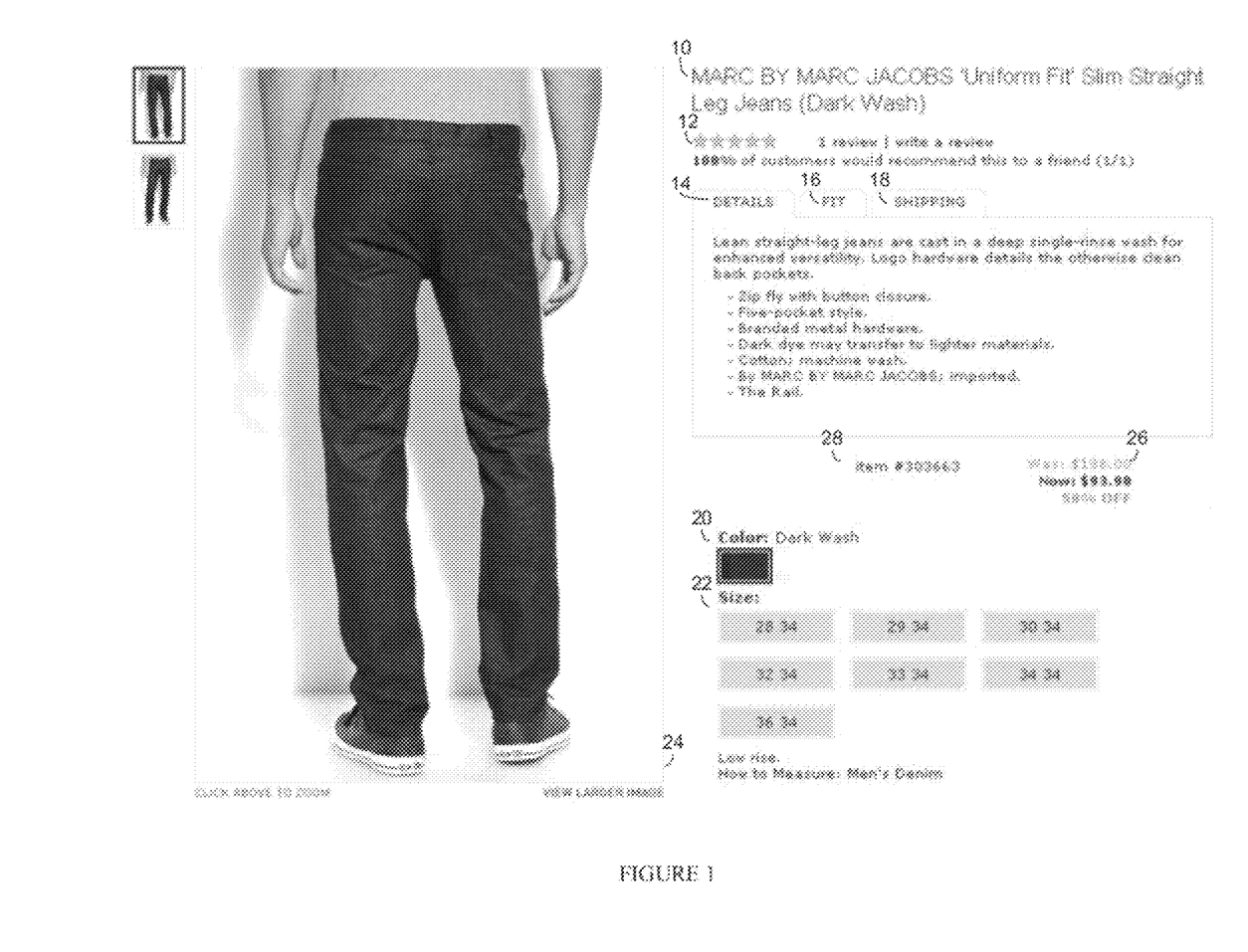
FIG. 1 is an example of a web page from which various elements of information are retrieved by a crawler operating in conjunction with a crawler configuration generated with a crawler configuration application, according to some embodiments of the invention.

As illustrated in FIG. 1, an example user interface for a merchant website is displayed. Using the CCK tool, a user can select various elements of information presented in the web page, and specify configuration information for use by a crawler in obtaining the elements of information. For instance, any of the following elements of information may be selected with the CCK tool for purposes of customizing or configuring the crawler: the descriptive name of the product 10, the users' ratings and reviews 12, the text within the details tab 14, the information presented within the fit tab 16, the shipping information 18, the color information 20, the size information 22, the picture 24, the pricing information 26, and the item number 28. In addition, with some embodiments, the crawler may identify a volume or amount of a particular product that is available within a particular geographical location.

The second component that is part of the structured data mining system is a suite of crawlers that are configured to use a crawler configuration created by the web-based CCK application. In contrast to conventional web crawlers, crawlers consistent with embodiments of the invention are configured to be driven by the crawler configurations that are created by the CCK, which can be quite complex. As a result, the crawlers can be configured to crawl web sites and obtain data that many conventional automated crawlers would have no way of accessing. As there may be many different crawlers in the suite of crawlers, the crawler configuration may specify the particular crawler for which the configuration is to be used.

Consistent with some embodiments of the invention, the web-based CCK application enables an approach to describing how to select desired information from various sources (HTML, XML, JSON, javascript, etc.). Fundamentally, the web-based CCK application defines sets of what are referred to herein as selectors, where each selector describes how to extract a single item of information (e.g. product title, retail price, product image URL, description, etc). Each selector is in essence a set of steps, or a pipeline, that describes a series of operations that are to be performed in order to request and then extract the desired information from a web server, for insertion into a database.

To establish a pipeline, the following steps or stages are followed.
1. Select elements from data source
2. Apply filters to the selected elements
3. Apply filters to the values of the selected elements
4. Apply custom treatments to values.

Each of the first three stages have several built-in mechanisms, but in most cases the user can, if necessary, fall back to writing code (e.g., python code) directly in the user interface of the web-based CCK application in order to define custom behaviors. For instance, the web-based CCK application includes a code editing module that enables a user to define a script or section of executable code, which can be executed to perform a customized operation that is not easily definable by the automated tools of the web-based CCK application. This code can be arbitrarily complex, so for example it can open new network resources, download additional web pages or assets, use third party libraries, and so on. Accordingly, the web-based CCK application enables a user to very quickly automate a crawler to retrieve an item of information from a web site, by generating a crawler configuration, and if necessary, customizing the behavior of the crawler to perform more complex operations. The custom treatments in stage four (4) are all built-in optimizations for common cases that are frequently encountered in this problem domain (e.g. handling of currency in prices).

In addition to configuration, the web-based CCK application also supports live testing of configurations as well as automated validation of crawler configurations. Accordingly, a user attempting to generate a crawler configuration to obtain a particular item of information about a product can select to test the crawler configuration in real-time, and observe how the crawler, controlled by the crawler configuration, performs the operations. This allows the user to tweak or modify the configuration to obtain the required data item.

Real-Time Product Availability Lookup (RTPAL)

In addition to using a crawler to obtain information, with some embodiments, a more formal or dedicated process might also be used. Whereas a crawler can obtain information from websites when the operator of the website does not provide a publically available API, the RTPAL generally relies on the existence of formal, publically accessible inventory systems to obtain product inventory information. For instance, with some embodiments, a Real-Time Product Availability Lookup (RTPAL) system is used to query external inventory systems. The RTPAL system consists primarily of three components. The first component is a framework for retrieval and caching of information from individual merchant inventory systems. The second component is a suite of components to make building clients to individual inventory systems easy. The third component is a set of individual clients (which are built using these components to run inside the framework) for accessing specific merchant inventory systems (i.e. individual big box retailers like Target, Best Buy, etc., as well as aggregate sources like Volusion or MerchantOS, and small merchant sources, such as Quickbooks or Microsoft Dynamic).

The RTPAL system has a cache system that uses ZVOTs (Zip-Code, Variation, Offer tuples) as cache keys. Specifically, the cache key used in querying the cache includes three components, a zip code relevant to the query, an offer identifier corresponding with the specific offer or product, and a variation identifier specifying or indicating the particular variant of the product or offering. The offer identifier is essentially synonymous with a product identifier, and uniquely identifies at a top level a particular product or item that is being offered for sale. A variation is a set of product specific characteristics. For example, for clothing, the variation may specify such characteristics as size and color, etc. With other products, other variations are possible. For instance, with a tablet computer, a variation may specify the amount of member (16 GB, 32 GB, 64 GB, etc.) included with the computer. The zip code is used to specify the zip code of relevance to the search. For instance, if a user is looking for a product in a particular zip code, the specified zip code can be used to query the cache and ensure only relevance cache information is returned. In other embodiments, the system might implement fuzzy geographic-based caching in order to drastically increase the cache hit rate and to support significantly higher traffic volumes.

Figure 2:
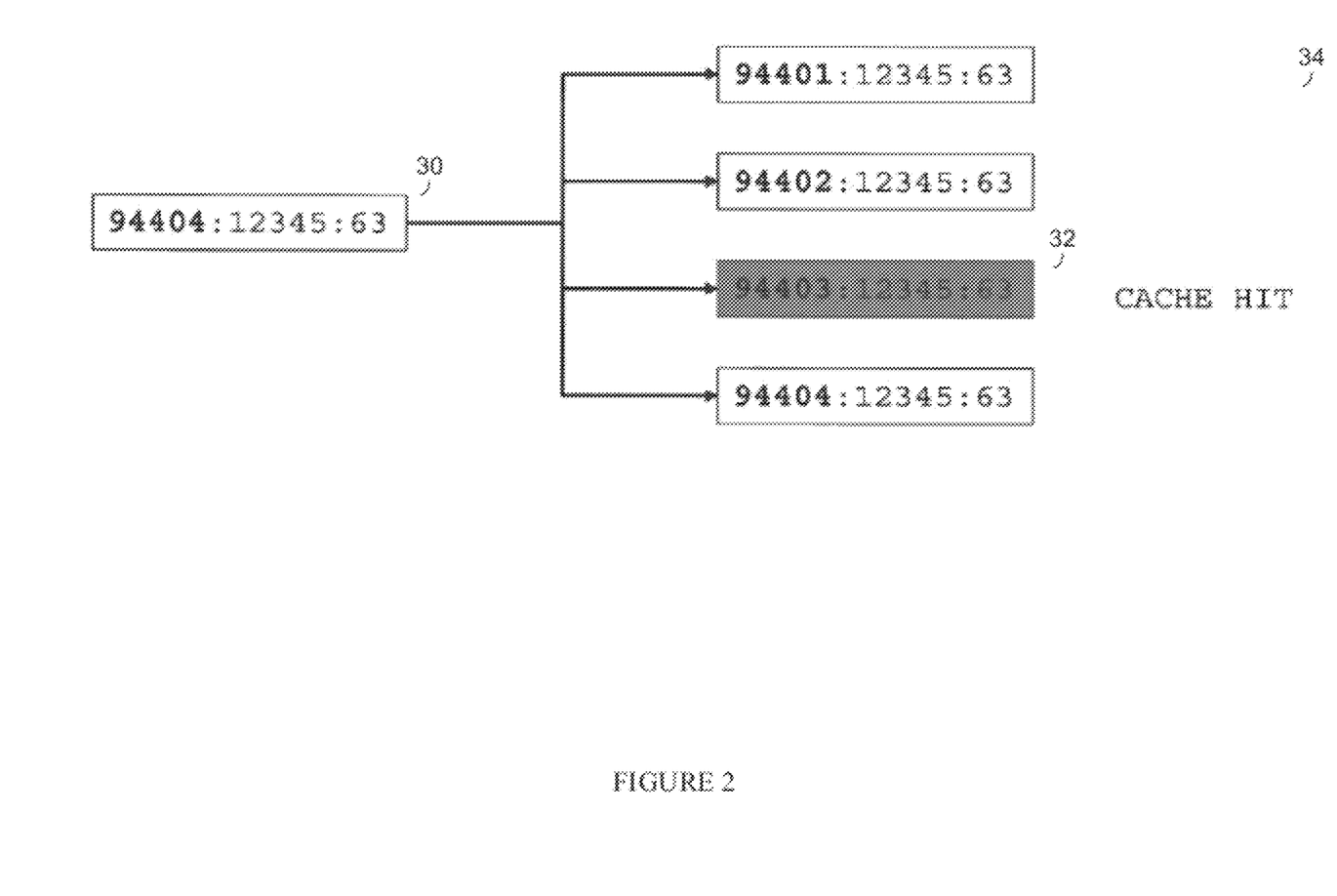
FIG. 2 is a block diagram illustrating an example of a cache key in the form of a three-tuple with a zip code, offer or product code, and offer variant, consistent with some embodiments of the invention.

As illustrated in FIG. 2, an example of a three-tuple (e.g., ZVOT) cache key for querying a cache is shown. For example, the cache key with reference 30 scores a cache hit with the cache entry having reference number 32 when used to query the cache entries on the right with reference number 34. By including the zip code in the cache key, those cache entries that are geographically relevant to a particular user's product query can be returned and presented with minimal processing delay.

Figure 3:
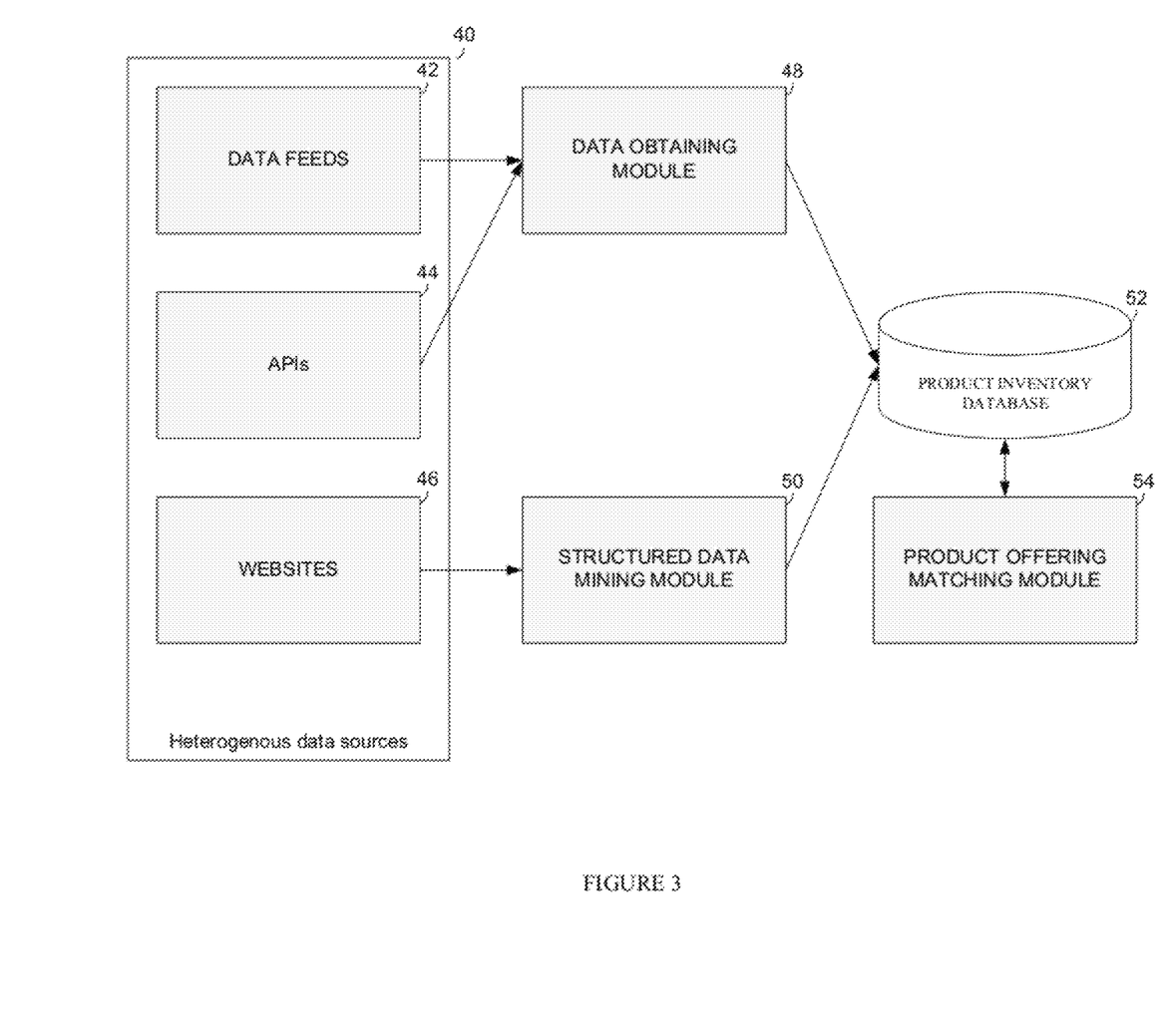
FIG. 3 is a block diagram illustrating the data source and data flows that occur for populating a database with product inventory information, according to some embodiments of the invention.

In addition to using the RTPAL and the structured data mining techniques described above, with some embodiments, product inventory information is received from third party sources via a simple data feed. Accordingly, FIG. 3 illustrates a block diagram of the various data sources from which product inventory information can be obtained. For instance, the data sources 40 include data feeds 42, application programming interfaces (APIs) 44 for accessing merchant-specific product inventory systems, and structured data mining of third-party websites 46. As illustrated in FIG. 3, the data obtaining module 48 facilitates the receiving of the prduct inventory information from the data feeds 42 and the RTPAL-based APIs 44, while the structured data mining module 50 facilitates the real-time receipt of information from third-party websites. As described in greater detail below, once obtained, the date is stored in a product inventory database 52 and enhanced, for example, by the product offering matching module 54.

Automated Product Matching

With some embodiments, automated product matching is performed by a product offering matching module 54 (FIG. 3). The goal of product matching is to aggregate offers for the same product to enhance the user experience. When data is collected, all attempts are made to capture unique product identifiers such as: UPC, EAN, ASIN, ISBN, SKU and Model Number. When one or more of the above identifiers are available, a rule-based algorithm is evoked to determine if the offer matches an existing product. If a match is achieved, the product or offer is assigned to the matching product. If none of the above identifiers are available, other attributes of the offer, for example title, description, brand and specifications are used to determine a similarity score with respect to one or more existing products. If a match is found, the matching product is assigned, and if not, a new product is created.

Automated Product Categorization

With some embodiments of the invention, a product type taxonomy is used. For instance, with some embodiments, the taxonomy may consist of approximately three-thousand (3000) unique categories and sub-categories, arranged as nodes of a tree-like hierarchical structure. Approximately twenty-six hundred (2600) of these unique categories may be leaf nodes. An example of a leaf node would be: Vehicle GPS Units. The aim of categorization is to ensure that every product offer has at least one category node assigned to it.

With some embodiments, labelled offers are collected. These labelled offers are used as training data in a machine learning algorithm, which then classifies the remaining unlabeled offers. The classification algorithm is a hybrid of variations on several different classic algorithms: Naive Bayes, Rocchio, and kNN. With some embodiments, precisions vary by category and are typically upwards of 0.9. Overall precision may be upwards of 0.96. With some embodiments, approximately 80% of active offers can be classified with the automated categorization system.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a sendee" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 4:
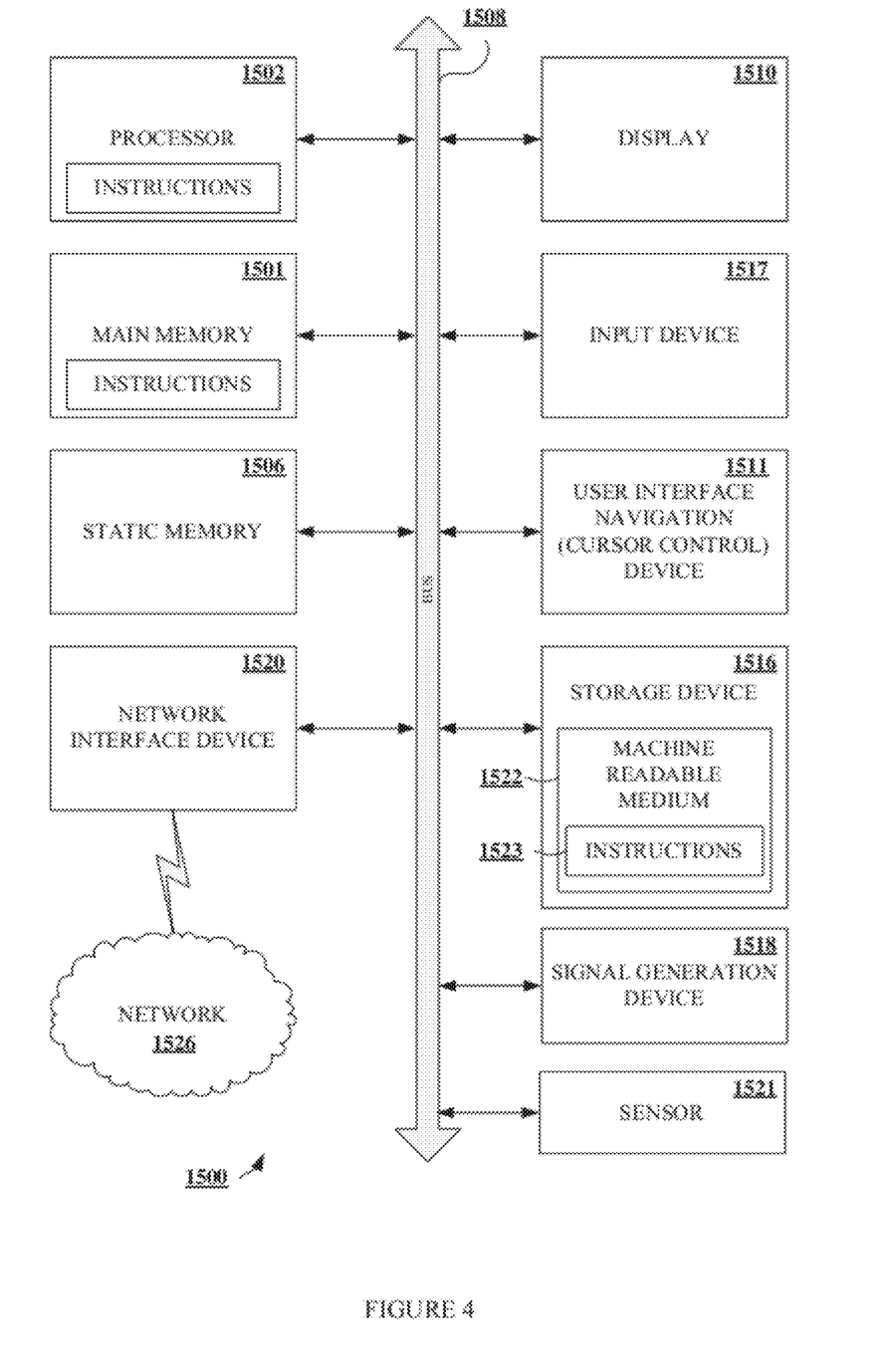
FIG. 4 is a block diagram of a machine in the form of a computing device within which a set of instructions, for causing the machine to perform any one or more of the methodologies discussed herein, may be executed.

FIG. 4 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method for populating a database with product inventory information, the method comprising:
   with one or more processors, executing a first set of instructions representing an instance of a crawler application, the instance of the crawler application to perform a set of operations specified in a crawler configuration file that has been generated with a web-based crawler configuration application, the performance of the set of operations resulting in the retrieval of product inventory information for one or more products hosted at one or more web servers;
   with at least one of the one or more processors, executing a second set of instructions representing an instance of a real-time product availability lookup (RTPAL) application, the RTPAL application to use one or more application programming interfaces (APIs) to request and receive product inventory information from one or more third-party network-connected inventory management systems;
   subsequent to receiving product inventory information as a result of executing either of the crawler application and the RTPAL application, determining that received product inventory information for a particular product does not specify a unique product identifier;
   performing a matching operation by comparing various elements of information concerning the particular product with corresponding information from one or more known products to determine a product with which the received product inventory information for the particular product not specifying the unique product identifier best matches;
   storing the received product inventory information for the particular product not specifying the unique product identifier in the database;
   receiving a search query from a user, the search query including information identifying a desired geographical area;
   processing the search query to provide product inventory information for a particular product satisfying the search query, the product inventory information for the particular product satisfying the search query specifying one or more merchant stores in a geographical location satisfying the desired geographical area identified in the query, and indicating a quantity of the particular product satisfying the search query available at each of the one or more merchant stores.

2. The method of claim 1, wherein the web-based crawler configuration application enables the user to specify one of a suite of web crawlers for use with a particular crawler configuration file generated by the web crawler configuration application.

3. The method of claim 1, wherein the web-based crawler configuration application enables the user to invoke a code editing application to specify customized code for obtaining a particular element of product inventory information, the customized code for inclusion in a crawler configuration file for use with a particular crawler.

4. The method of claim 1, further comprising:
storing product inventory information for a particular product received via the crawler application or the RTPAL application in a data cache with each cache entry having a cache key based on a zipcode for a location at which the particular product received via the crawler application or the RTPAL application is available, a product identifier, and a product variation identifier.

5. The method of claim 1, further comprising:
assigning to each product identified in the received product inventory information as a result of executing either of the crawler application and the RTPAL application one or more category identifiers for a particular category in a hierarchical category.

6. A machine-readable storage medium storing instructions thereon, which, when executed by a processor of a server, will cause the server to perform a set of operations comprising:
executing a first set of instructions representing an instance of a crawler application, the instance of the crawler application to perform a set of operations specified in a crawler configuration file that has been generated with a web-based crawler configuration application, the performance of the set of operations resulting in the retrieval of product inventory information for one or more products hosted at one or more web servers;
executing a second set of instructions representing an instance of a real-time product availability lookup (RTPAL) application, the RTPAL application to use one or more application programming interfaces (APIs) to request and receive product inventory information from one or more third-party network-connected inventory management systems;
subsequent to receiving product inventory information as a result of executing either of the crawler application and the RTPAL application, determining that received product inventory information for a particular product does not specify a unique product identifier;
performing a matching operation by comparing various elements of information concerning the particular product with corresponding information from one or more known products to determine a product with which the received product inventory information for the particular product not specifying the unique product identifier best matches;
storing the product inventory information for the particular product not specifying the unique product identifier in a database;
storing product inventory information for a particular product received via the crawler application or the RTPAL application in a data cache with each cache entry having a cache key based on a zipcode for a location at which the product is available, a product identifier, and a product variation identifier.

7. The machine-readable medium of claim 6, wherein the web-based crawler configuration application enables a user to specify one of a suite of web crawlers for use with a particular crawler configuration file generated by the web crawler configuration application.

8. The machine-readable medium of claim 6, wherein the web-based crawler configuration application enables a user to invoke a code editing application to specify customized code for obtaining a particular element of product inventory information, the customized code for inclusion in a crawler configuration file for use with a particular crawler.

9. The machine-readable medium of claim 6, wherein the operations further comprise:
assigning to each product identified in the received product inventory information as a result of executing either of the crawler application and the RTPAL application one or more category identifiers for a particular category in a hierarchical category.

10. The machine-readable medium of claim 6, wherein the operations further comprise:
receiving a search query from a user, the search query including information identifying a desired geographical area;
processing the user's search query to provide product inventory information for a particular product satisfying the search query, the product inventory information specifying one or more merchant stores in a geographical location satisfying the desired geographical area identified in the query, and indicating a quantity of the particular product satisfying the search query available at each of the one or more merchant stores.

11. A product search engine comprising:
one or more processors for executing one or more sets of instructions stored in memory;
a first set of executable instructions stored in the memory and representing an instance of a crawler application, which, when executed, is to perform a set of operations specified in a crawler configuration file that has been generated with a web-based crawler configuration application, the performance of the set of operations resulting in the retrieval of product inventory information for one or more products hosted at one or more web servers;
a second set of executable instructions stored in the memory and representing an instance of a real-time product availability lookup (RTPAL) application, the RTPAL application, when executed, to use one or more application programming interfaces (APIs) to request and receive product inventory information from one or more third-party network-connected inventory management systems;
a third set of executable instructions representing a product offering matching module, which, when executed, is to determine that received product inventory information for a particular product does not specify a unique product identifier and then perform a matching operation by comparing various elements of information concerning the particular product with corresponding information from one or more known products to determine a product with which the received product inventory information for the particular product not specifying the unique product identifier best matches;
a database module to store the product inventory information for the particular product not specifying the unique product identifier in a database; and
a cache module for storing the product inventory information for a particular product received via the crawler application or the RTPAL application in a data cache with each cache entry having a cache key based on a zipcode for a location at which the product is available, a product identifier, and a product variation identifier.

12. The method of claim 11, wherein the web-based crawler configuration application enables a user to specify one of a suite of web crawlers for use with a particular crawler configuration file generated by the web crawler configuration application.

13. The method of claim 11, wherein the web-based crawler configuration application enables a user to invoke a code editing application to specify customized code for obtaining a particular element of product inventory information, the customized code for inclusion in a crawler configuration file for use with a particular crawler.

14. The method of claim 11, further comprising a categorization module to assign to each product identified in the received product inventory information as a result of executing either of the crawler application and the RTPAL application one or more category identifiers for a particular category in a hierarchical category.

15. The method of claim 11, further comprising a search module to:
   receive a search query from a user, the search query including information identifying a desired geographical area;
   process the user's search query to provide product inventory information for a particular product satisfying the search query, the product inventory information for the particular product satisfying the search query specifying one or more merchant stores in a geographical location satisfying the desired geographical area identified in the query, and indicating a quantity of the particular product available at each of the one or more merchant stores.

* * * * *